United States Patent
Lara Gomez

(10) Patent No.: US 10,110,420 B1
(45) Date of Patent: Oct. 23, 2018

(54) ORTHOGONAL ENCODING OF DIAGNOSTIC INFORMATION IN A COMPUTER NETWORK

(71) Applicant: Amazon Technologies, Inc., Seattle, WA (US)

(72) Inventor: Ezequiel Lara Gomez, Dublin (IE)

(73) Assignee: Amazon Technologies, Inc., Seattle, WA (US)

(*) Notice: Subject to any disclaimer, the term of this patent is extended or adjusted under 35 U.S.C. 154(b) by 234 days.

(21) Appl. No.: 15/250,775

(22) Filed: Aug. 29, 2016

(51) Int. Cl.
H04L 12/24 (2006.01)
H04L 29/06 (2006.01)
H04L 12/26 (2006.01)

(52) U.S. Cl.
CPC ........ H04L 41/0631 (2013.01); H04L 43/065 (2013.01); H04L 43/0823 (2013.01);
(Continued)

(58) Field of Classification Search
CPC ..... H04L 41/14; H04L 41/0631; H04L 43/00; H04L 43/06; H04L 43/0823; H04L 43/0876; H04L 67/42
See application file for complete search history.

(56) References Cited

U.S. PATENT DOCUMENTS 5,761,429 A * 6/1998 Thompson .......... H04L 41/0233
709/224
5,905,963 A * 5/1999 Lysejko ................. H04B 1/707
375/E1.002
(Continued)

FOREIGN PATENT DOCUMENTS

DE 102008050023 A1 * 5/2009 ............ F02D 11/106
EP 1235375 A2 * 8/2002 .......... H04J 13/0048
(Continued)

OTHER PUBLICATIONS

B. Sherlock, J. A. Neasham and C. C. Tsimenidis, "Implementation of a spread-spectrum acoustic modem on an android mobile device," OCEANS 2017—Aberdeen, Aberdeen, 2017, pp. 1-9. doi: 10.1109/OCEANSE.2017.8084730.*

(Continued)

Primary Examiner — Kostas Katsikis
(74) Attorney, Agent, or Firm — Davis Wright Tremaine LLP

(57) ABSTRACT

In a computer network, network-connected devices generate and encode diagnostic information using an orthogonal code specific to each of the network-connected devices. In some implementations, the orthogonal code is a Walsh Code, a Walsh-Hadamard code, or a prime number. The encoded diagnostic information is transmitted to a router. The router aggregates and combines the encoded diagnostic information into a combined diagnostic value. Additional diagnostic information may be generated, encoded, and added to the combined diagnostic value by the router. The combined diagnostic value may be transmitted to additional upstream routers where additional diagnostic information is encoded and multiplexed into the combined diagnostic value. The combined diagnostic value may be collected by a network management console where the original diagnostic information associated with a particular network-connected device may be recovered by decoding the combined diagnostic value with the orthogonal code associated to the particular network-connected device.

20 Claims, 9 Drawing Sheets

(52) U.S. Cl.
CPC .......... *H04L 41/14* (2013.01); *H04L 43/0876* (2013.01); *H04L 67/42* (2013.01)

(56) References Cited

U.S. PATENT DOCUMENTS

| | | | | |
|---|---|---|---|---|
| 7,310,522 | B2* | 12/2007 | Geile | G06F 17/14 455/424 |
| 7,443,805 | B1* | 10/2008 | Bynum | H04L 41/0816 370/254 |
| 7,535,822 | B2* | 5/2009 | Geile | G06F 17/14 370/208 |
| 7,672,219 | B2* | 3/2010 | Geile | G06F 17/14 370/207 |
| 7,675,843 | B2* | 3/2010 | Geile | G06F 17/14 370/206 |
| 7,697,453 | B2* | 4/2010 | Geile | G06F 17/14 370/252 |
| 7,706,349 | B2* | 4/2010 | Geile | G06F 17/14 370/343 |
| 7,756,060 | B2* | 7/2010 | Geile | G06F 17/14 370/252 |
| 7,773,537 | B2* | 8/2010 | Geile | G06F 17/14 370/252 |
| 7,872,985 | B2* | 1/2011 | Geile | G06F 17/14 370/252 |
| 7,881,180 | B2* | 2/2011 | Geile | G06F 17/14 370/204 |
| 7,881,181 | B2* | 2/2011 | Dapper | G06F 17/14 370/206 |
| 7,912,138 | B2* | 3/2011 | Geile | G06F 17/14 375/260 |
| 7,936,662 | B2* | 5/2011 | Geile | G06F 17/14 370/208 |
| 7,957,265 | B2* | 6/2011 | Geile | G06F 17/14 370/210 |
| 7,983,141 | B2* | 7/2011 | Geile | G06F 17/14 370/207 |
| 7,995,454 | B2* | 8/2011 | Geile | G06F 17/14 370/206 |
| 8,089,853 | B2* | 1/2012 | Dapper | G06F 17/14 370/203 |
| 8,174,956 | B2* | 5/2012 | Dapper | G06F 17/14 370/204 |
| 8,199,632 | B2* | 6/2012 | Geile | G06F 17/14 370/208 |
| 8,213,398 | B2* | 7/2012 | Geile | G06F 17/14 370/343 |
| 8,213,399 | B2* | 7/2012 | Geile | G06F 17/14 370/343 |
| 8,315,150 | B2* | 11/2012 | Geile | G06F 17/14 370/204 |
| 8,351,321 | B2* | 1/2013 | Dapper | G06F 17/14 370/204 |
| 8,406,115 | B2* | 3/2013 | Dapper | G06F 17/14 370/206 |
| RE44,460 | E * | 8/2013 | Geile | G06F 17/14 455/424 |
| 8,547,824 | B2* | 10/2013 | Dapper | G06F 17/14 370/210 |
| 8,638,655 | B2* | 1/2014 | Geile | G06F 17/14 370/208 |
| 2002/0019236 | A1* | 2/2002 | Thompson | H04L 43/0876 455/452.2 |
| 2003/0064719 | A1* | 4/2003 | Horne | H04W 24/00 455/423 |
| 2004/0042530 | A1* | 3/2004 | Ryu | H04B 1/69 375/141 |
| 2005/0025087 | A1* | 2/2005 | Tamura | H04W 52/0232 370/320 |
| 2005/0141263 | A1* | 6/2005 | Umeda | G06K 9/0002 365/149 |
| 2005/0237919 | A1* | 10/2005 | Pettendorf | H04J 13/0044 370/208 |
| 2006/0158202 | A1* | 7/2006 | Umeda | G06K 9/0002 324/686 |
| 2009/0093262 | A1* | 4/2009 | Gao | H04W 68/00 455/458 |
| 2011/0109486 | A1* | 5/2011 | Kim | H04J 13/10 341/100 |

FOREIGN PATENT DOCUMENTS

| | | | | |
|---|---|---|---|---|
| JP | 2002232391 | A | * 8/2002 | .......... H04J 13/0048 |
| KR | 20000050721 | A | * 8/2000 | |
| KR | 20000050967 | A | * 8/2000 | |
| KR | 100307705 | B1 | * 9/2001 | |
| KR | 100308887 | B1 | * 9/2001 | |
| KR | 20030095103 | A | * 12/2003 | |
| RU | 2168866 | C1 | * 6/2001 | |

OTHER PUBLICATIONS

"Code Division Multiple Access," Wikipedia, The Free Encyclopedia, May 13, 2016, <https://en.wikipedia.org/wiki/Code_division_multiple_access> [retrieved Aug. 9, 2016], 10 pages.
Gilhousen, K.S., et al., "On the Capacity of a Cellular CDMA System," IEEE Transactions on Vehicular Technology 40(2):303-312, May 1991.
Kohno, R., et al., "Spread Spectrum Access Methods for Wireless Communications," IEEE Communications Magazine 33(1):58-67, Jan. 1995.
Leopedrini, "What Does Orthogonal Means in Wireless Networks?," telecomHall, Oct. 31, 2014, <http://www.telecomhall.com/what-does-orthogonal-means-in-wireless-networks.aspx> [retrieved Aug. 9, 2016], 15 pages.
Singhal, K., "Walsh Codes, PN Sequences and Their Role in CDMA Technology," Term Paper—EEL 201, CSE Department, IIT Delhi, 4 pages.

* cited by examiner

ORTHOGONAL ENCODING OF DIAGNOSTIC INFORMATION IN A COMPUTER NETWORK

BACKGROUND

Computer networks are an important part of contemporary computing environments. Using a computer network, network entities such as network appliances, client computers, server computers, mobile devices, and other devices are able to exchange information, utilize network-based services, and work together to perform complex operations. Network entities may be connected to a computer network using a wired connection such as an Ethernet connection, a wireless connection such as a Wi-Fi connection, or a virtual connection using a virtual network adapter. In a packet-switched network, information transferred between two network entities is arranged and transmitted as a packet, and the packet includes information identifying the sender and the intended recipient of the packet. If there is not a direct connection between the sender and the intended recipient, the packet may be relayed by an intermediary device or router. After receiving the packet, the router attempts to forward the packet to the intended recipient or, if the intended recipient is not accessible, to another router that is closer, in network terms, to the intended recipient. Depending at least on the topology of the computer network and the network distance between the sender and the intended recipient, a number of routers may be used to relay the packet to the intended recipient.

Some computer networks, such as the Internet, use many routers to enable interconnections between hundreds, thousands, or even millions of network entities thereby creating a large number of possible sender/recipient combinations. Occasionally, routers may fail, resulting in packet loss or corruption. Therefore, detecting packet loss, and identifying routers that are responsible for packet loss is an important problem.

BRIEF DESCRIPTION OF THE DRAWINGS

Various techniques will be described with reference to the drawings, in which.

DETAILED DESCRIPTION

Figure 1:
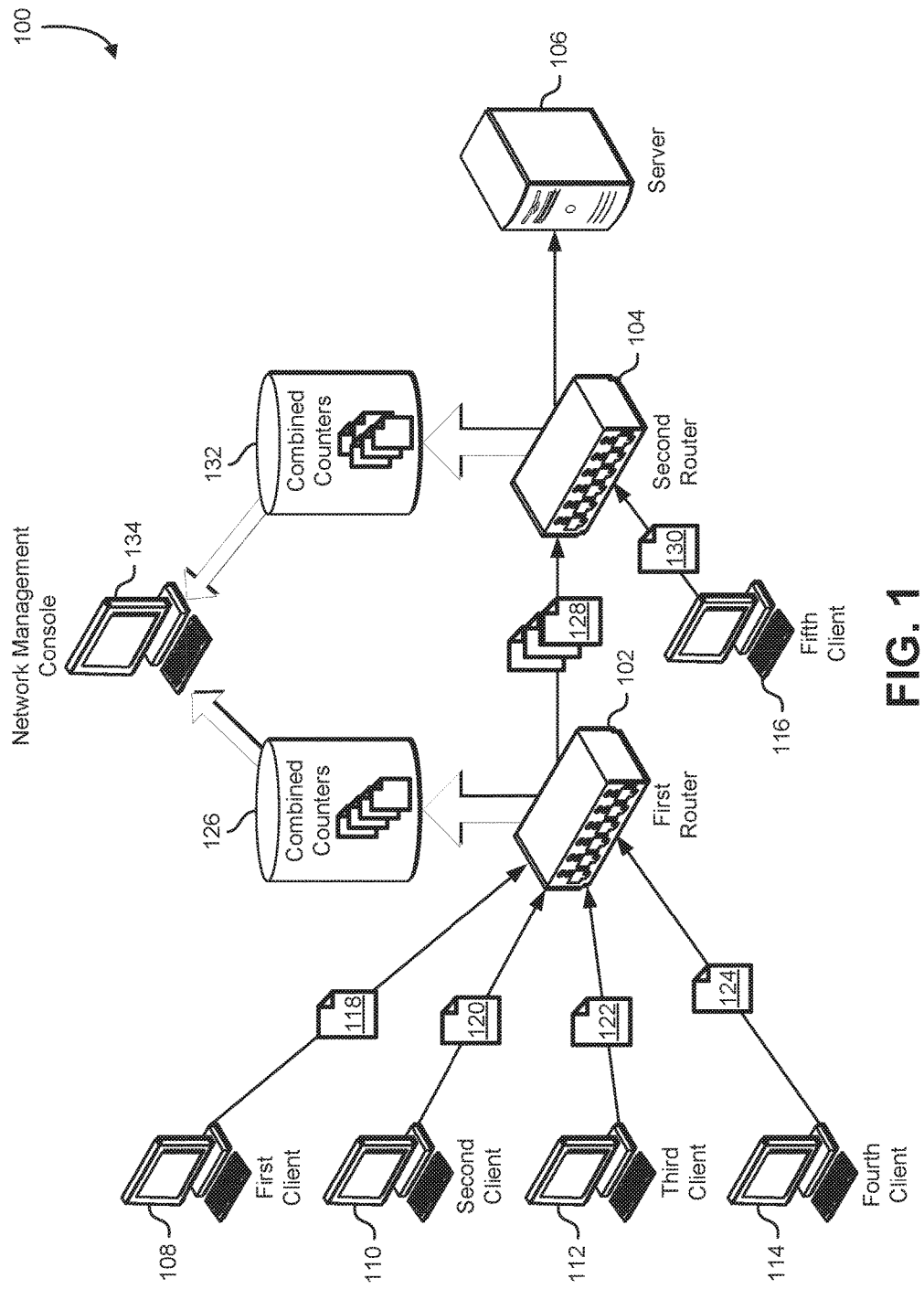
FIG. 1 shows an illustrative example of an environment in which various embodiments may be practiced.

The current document describes a system that improves the operation of a computer network by facilitating the collection of network counters and other diagnostic information from clients, servers, routers, and other network entities on the computer network. For example, network counters generated by a particular network entity may include a number of packets received from a particular source, a number of packets transmitted to a particular destination, a number of network collisions detected, a number of corrupt packets received, or other network-related diagnostic information. The network counters generated by each network entity are encoded, transmitted over the computer network, and collected at a network management console. The network management console analyzes the network counters to identify network anomalies and faults. For example, the network management console may analyze network traffic between a source entity and a destination entity by examining the network counters provided by a series of routers between the source entity and the destination entity. Differences in the network counters provided by the series of routers allow the management console to detect packet loss, and locate a failing router within the series of routers.

A substantial number of network counters may be generated and maintained by each network entity in a computer network. As a result, to facilitate analysis by the network management console, a correspondingly substantial amount of information may be transmitted from each of the network entities to the network management console. Therefore, efficiently encoding, transmitting, and storing the diagnostic information generated by the network entities is an important problem.

In various examples described below, orthogonal encoding allows a plurality of network entities to multiplex multiple network counters into a single combined encoded value. The combined encoded value may be transmitted to a recipient, combined with other encoded values, and decoded to recover the original network counters. In some implementations, network entities that generate network diagnostic information use Walsh codes or Walsh-Hadamard codes to encode the diagnostic information. The encoded diagnostic information is transmitted to a recipient that combines the encoded diagnostic information into a combined signal. The combined signal may be forwarded in digital form to other routers where other encoded diagnostic values may be added to the combined signal. A recipient of the combined signal, such as a network management console, decodes each original diagnostic value from the combined signal using the Walsh code corresponding to the entity that encoded the diagnostic value. In addition, a recipient of the combined signal may detect the absence of a particular source by decoding the combined signal with the Walsh code associated with the particular source, and producing a null signal.

In some examples, diagnostic analysis is performed on a computer network by actively sending diagnostic packets across the network via a network path that includes a series of intermediate routers. Many potential network paths may traverse a particular router, and as a result, the particular router may receive many such diagnostic packets. The process of identifying a source associated with each such diagnostic packet, and the process of storing each such diagnostic packet, can consume considerable computing resources. In a computer network that includes a plurality of interconnected intermediate routers, a multiplicity of potential paths may traverse a particular router. Detecting network issues associated with each potential path can be accomplished by sending one or more diagnostic packets over each path, and then correlating the information collected from each diagnostic packet with the path in question.

By assigning a different orthogonal code such as a Walsh code to each network path or network entity, diagnostic information associated with each network path or network entity may be encoded and combined into a single combined value. When a combined value is received by a recipient, the recipient may encode and combine additional diagnostic information with the combined value. The combined value may be forwarded to additional network entities where additional encoded diagnostic packets may be combined with the combined value so long as there are additional Walsh codes available. When the combined value is received by a consumer of the diagnostic information such as a management console, the consumer extracts each piece of diagnostic information from the combined value using a Walsh code corresponding to each network entity or path.

In some implementations, the encoding and decoding of diagnostic information may be facilitated at least in part by hardware-based processors. For example, hardware-based data-encoding solutions may be used to perform orthogonal encoding on the diagnostic information. When the encoded diagnostic information is received by a recipient on a computer network, the encoded diagnostic information can be combined using a hardware-based processor that produces a combined encoded data packet, and the combined encoded data packed can be transmitted across the computer network to another network entity or to a network management console.

FIG. 1 shows an illustrative example of an environment in which various embodiments may be practiced. A network diagram 100 shows a computer network that connects a number of client computer systems to a network server. The computer network includes a first router 102 that is in communication with a second router 104. In some examples, communication between the first router 102 and the second router 104 is accomplished using a wired network connection such as an Ethernet connection, a 10BaseT connection, or optical fiber connection. In other examples, communication between the first router 102 and the second router 104 is accomplished using wireless connection such as a Wi-Fi connection or cellular link. Each router in the computer network routes network packets between various network clients and servers that are connected to the computer network. Network clients may be connected to the computer network via wired or wireless connections. In the computer network shown in FIG. 1, a server 106 is connected to the second router 104. The server 106 may be a computer server, server cluster, a virtual server, or server appliance. A number of network clients communicate over the computer network with the server 106. A first client 108, a second client 110, a third client 112, and a fourth client 114 are connected to the first router 102. A fifth client 116 is connected to the second router 104. The systems and methods described in the present document for encoding and collecting diagnostic information are not limited to the specific network topology shown in FIG. 1.

Various diagnostic information is generated and distributed throughout the computer network. The diagnostic information may be generated by various network entities on the computer network, and may include network counters, diagnostic packets, or other diagnostic information. Each network entity that generates diagnostic information accumulates the diagnostic information into a diagnostic packet. The diagnostic packet may include one or more network counters. In the example shown in FIG. 1, the clients that are connected to the first router 102 provide diagnostic information to the first router 102. The first client 108 generates a first diagnostic packet 118, the second client 110 generates a second diagnostic packet 120, the third client 112 produces a third diagnostic packet 122, and the fourth client 114 generates a fourth diagnostic packet 124. Each source of diagnostic information on the network is assigned a unique orthogonal code. In the example shown in FIG. 1, each network entity is assigned a unique orthogonal code, and the diagnostic packets 118, 120, 122, and 124 are encoded by the respective clients using an orthogonal code specific to each client. For example, the network entities shown in FIG. 1 may be assigned orthogonal Walsh codes as follows:

| Network Entity | Code |
| --- | --- |
| First client: | 1 1 1 1 1 1 1 1 |
| Second client: | 1 1 1 1 0 0 0 0 |
| Third client: | 1 1 0 0 1 1 0 0 |
| Fourth client: | 1 1 0 0 0 0 1 1 |
| Fifth client: | 1 0 1 0 1 0 1 0 |
| Server: | 1 0 1 0 0 1 0 1 |
| First router: | 1 0 0 1 1 0 0 1 |
| Second router: | 1 0 0 1 0 1 1 0 |

The first router 102 receives the diagnostic packets 118, 120, 122, and 124 from the network clients, and combines the diagnostic packets into a combined value. The combined value is stored in a first diagnostic data store 126 maintained by the first router 102. In some implementations, Walsh codes are used to encode the diagnostic packets. If Walsh codes are used to encode the diagnostic packets, the diagnostic packets may be combined by adding each bit of the diagnostic packet to create a representation of a combined signal. In another implementation, orthogonal bit masks are used to encode the diagnostic packets. If orthogonal bit masks are used to encode the diagnostic packets, the encoded diagnostic packets may be added to form a combined value.

In some implementations, encoded diagnostic packets are received by a router and combined with additional diagnostic information generated by the router to generate a multi-hop combined diagnostic packet. In the example shown in FIG. 1, the first router 102 generates additional diagnostic information which is encoded using an orthogonal code associated with the first router 102. The additional information is combined with the diagnostic packets 118, 120, 122, and 124 received from the clients to produce a multi-hop combined diagnostic packet 128. The multi-hop combined diagnostic packet 128 includes information encoded with five different orthogonal codes. The multi-hop combined diagnostic packet 128 is transmitted from the first router 102 to the second router 104. A recipient of the multi-hop combined diagnostic packet 128 is able to extract the diagnostic information of each of the five sources of diagnostic information by decoding the multi-hop combined diagnostic packet 128 with each of the five different orthogonal codes.

The second router 104 receives the multi-hop combined diagnostic packet 128 from the first router 102, and a fifth diagnostic packet 130 from the fifth client 116. The multi-hop combined diagnostic packet 128 and the fifth diagnostic packet 130 are encoded using different orthogonal codes from the same orthogonal code set, allowing the second router 104 to combine the combined diagnostic packet 128 and the fifth diagnostic packet 130 into a new multi-hop combined diagnostic packet. The resulting new combined diagnostic packet is saved by the second router 104 in a second diagnostic data store 132. The new combined diagnostic packet includes diagnostic information from the clients 108, 110, 112, 114, 116 and from the first router 102 and the second router 104.

In some implementations, network packets are routed by the first router 102 and the second router 104 across the computer network between the clients 108, 110, 112, 114, 116 and the server 106. The first router 102 maintains a set of network counters that track the number of data packets received from each client. When the first router 102 receives a network packet, the first router identifies the origin of the network packet and increments a corresponding network counter. For example, a first network counter counts the number of packets received from the first client 108. A second network counter counts the number of packets received from the second client 110. A third network counter counts the number of packets received from the third client 112. The second router 104 maintains a corresponding set of network counters that track the number of data packets received from each client. The network counters generated by the first router 102 and the network counters generated by the second router 104 are encoded and combined into a single diagnostic packet and stored on the second diagnostic data store 132 as described above.

A network management console 134 may use diagnostic information extracted from the first diagnostic data store 126 and the second diagnostic data store 132 to analyze network performance and identify network faults. In the example shown in FIG. 1, the network management console 134 retrieves a first combined diagnostic packet from the first diagnostic data store 126. Using orthogonal codes associated with each network entity in the computer network, the network management console 134 decodes the first combined diagnostic packet to acquire the individual network counters generated by each network entity. The network management console 134 retrieves a second combined diagnostic packet from the second diagnostic data store 132. Using orthogonal codes associated with each network identity in the computer network, the network management console 134 decodes the second combined diagnostic packet to acquire the network counters of each network entity.

The network counters may be analyzed by the network management console 134 to identify paths through the computer network that are associated with packet loss. For example, a network path may be established between the first client 108 and the server 106. A first network counter on the first router 102 tracks the number of packets received at the first router 102 from the first client 108, and a second network counter on the second router 104 tracks the number of packets received at the second router 104 from the first client 108. Differences between the first counter and the second counter indicate packet loss between the first router 102 and the second router 104. The network management console 134 may infer additional information from the presence or absence of particular network counters in a combined diagnostic packet. For example, if the network management console 134 determines that a particular network counter associated with a particular client is missing from a combined diagnostic packet, the network management console 134 may determine that the connection to the particular client has failed or that the encoded diagnostic packet from the particular client was lost in transmission.

An orthogonal code belongs to a set of codes in which all pairwise cross correlations (dot products) are zero. Correlation describes the concept of determining how much similarity one code has with another, and cross correlation describes the similarity of two different codes in a code set. In the case of Walsh codes, a set of Walsh codes may be represented as a matrix, where each row of the matrix is orthogonal to every other row, and to the inverse of every other row. Therefore, two sets of data encoded with different Walsh codes (rows) of a particular Walsh matrix may be combined so that they do not interfere with each other.

Figure 2:
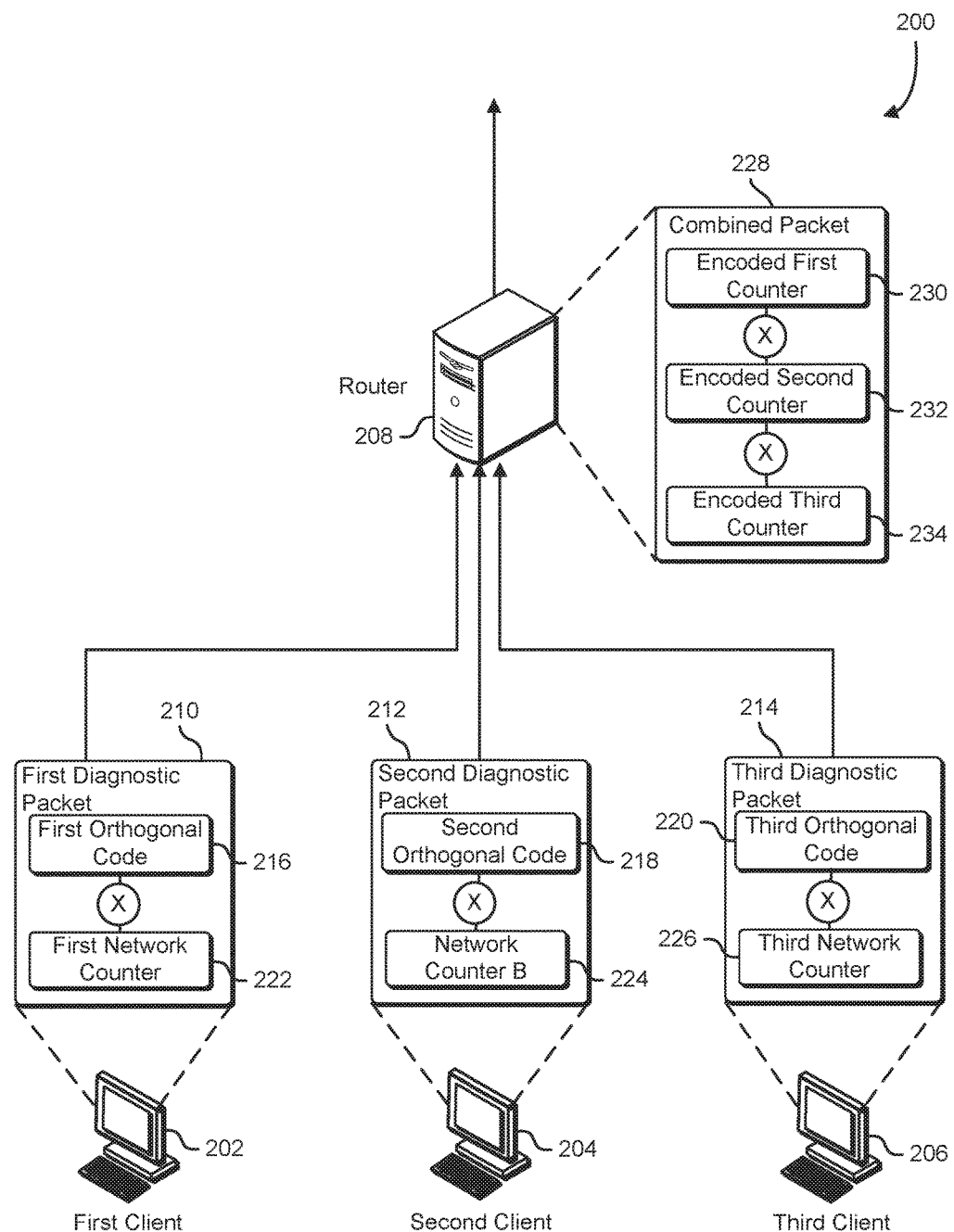
FIG. 2 shows an illustrative example of an environment in which a number of network clients provide diagnostic information to a network router by at least in part encoding the diagnostic information with orthogonal codes.

FIG. 2 shows an illustrative example of an environment in which a number of network clients provide diagnostic information to a network router at least in part by encoding the diagnostic information with orthogonal codes. A network diagram 200 shows a portion of a computer network. A first client 202, a second client 204, and a third client 206, are connected to the computer network via a router 208. Each network client generates diagnostic information in the form of a network counter, and encodes the network counter using an orthogonal code assigned to the client to produce a diagnostic packet. The first client 202 produces a first diagnostic packet 210, the second client 204 produces a second diagnostic packet 212, and the third client 206 produces a third diagnostic packet 214. The first client 202 produces the first diagnostic packet 210 by generating a first network counter 222, and encoding the first network counter 222 with a first orthogonal code 216. The second client 204 produces the second diagnostic packet 212 by generating a second network counter 224, and encoding the second network counter 224 with a second orthogonal code 218. The third client 206 produces the third diagnostic packet 214 by generating a third network counter 226, and encoding the third network counter 226 with a third orthogonal code 220. The first orthogonal code 216, the second orthogonal code 218, and the third orthogonal code 220 are individual codes selected from an orthogonal code set. In various examples, the orthogonal code set may be based on a set of Walsh codes, a set of orthogonal bit masks, or set of prime numbers.

The diagnostic packets are transmitted from the clients to the router 208. The router 208 receives the diagnostic packets, and combines the diagnostic packets into a combined packet 228. The router 208 extracts an encoded first counter 230 from the first diagnostic packet 210, extracting an encoded second counter 232 from the second diagnostic packet 212, and extracting an encoded third counter 234 from the third diagnostic packet 214. The encoded first counter 230, the encoded second counter 232, and the encoded third counter 234 combined in accordance with the type of orthogonal code used to produce the diagnostic packets. In some examples, the type of orthogonal code used is a Walsh code, and the encoded counters are combined by performing a bit-wise addition on the encoded counters. In another example, an orthogonal code is applied to the diagnostic packets by multiplying the content of each diagnostic packet by a spreading value or by performing a binary shift on the content of each diagnostic packet, and the encoded counters are combined by adding the encoded counters.

The following example illustrates one way in which Walsh codes may be used to encode and decode the network counters. A 2-bit Walsh code having codes of (1,−1) and (1,1) is used to encode values from the first router and a second router. The first router is assigned the code of (1,−1), and the second router is assigned a code of (1,1). The codes assigned to the first router and the second router may be represented in binary by representing a −1 value with a zero. Encoding is accomplished by performing an exclusive OR operation on the code and the corresponding data. Decoding is accomplished by computing a dot product of encoded value and a corresponding Walsh code. The following example shows how diagnostic data may be encoded and decoded using Walsh codes:

A first router is assigned an orthogonal code of (1,0), and encodes a network counter having a value of 1011 as follows:

| Data (Binary) | 1 | | 0 | | 1 | | 1 | |
|---|---|---|---|---|---|---|---|---|
| Data (Level) | 1 | | −1 | | 1 | | −1 | |
| Code (Binary) | 1 | 0 | 1 | 0 | 1 | 0 | 1 | 0 |
| Code (Level) | 1 | −1 | 1 | −1 | 1 | −1 | 1 | −1 |
| Encoded Data (Binary) | 1 | 0 | 0 | 1 | 1 | 0 | 1 | 0 |
| Encoded Data (Level) | 1 | −1 | −1 | 1 | 1 | −1 | 1 | −1 |

A second router is assigned an orthogonal code of (1,1), and encodes a network counter having a value of 0011 as follows:

| Data (Binary) | 0 | | 0 | | 1 | | 1 | |
|---|---|---|---|---|---|---|---|---|
| Data (Level) | −1 | | −1 | | 1 | | 1 | |
| Code (Binary) | 1 | 1 | 1 | 1 | 1 | 1 | 1 | 1 |
| Code (Level) | 1 | 1 | 1 | 1 | 1 | 1 | 1 | 1 |
| Encoded Data (Binary) | 0 | 0 | 0 | 0 | 1 | 1 | 1 | 1 |
| Encoded Data (Level) | −1 | −1 | −1 | −1 | 1 | 1 | 1 | 1 |

The data is combined by adding the level-coded data into a combined signal, and converting the signal into a digital representation.

| First-Router Data | 1 | −1 | −1 | 1 | 1 | −1 | 1 | −1 |
|---|---|---|---|---|---|---|---|---|
| Second-Router Data | −1 | −1 | −1 | −1 | 1 | 1 | 1 | 1 |
| Combined Data (Level) | 0 | −2 | −2 | 0 | 2 | 0 | 2 | 0 |
| Combined Data (Binary) | 000 | 110 | 110 | 000 | 010 | 000 | 010 | 000 |

The original data transmitted by the first router can be recovered by decoding the combined signal as follows:

| Combined Data (Level) | 0 | −2 | −2 | 0 | 2 | 0 | 2 | 0 |
|---|---|---|---|---|---|---|---|---|
| Code (Level) | 1 | −1 | 1 | −1 | −1 | −1 | −1 | 1 |
| Dot Product | (0,−2)(1,−1) | | (−2,0)(1,−1) | | (2,0)(1,−1) | | (2,0)(1,−1) | |
| Encoded Data (Binary) | (0+2) | | (−2+0) | | (2+0) | | (2+0) | |
| Decoded Data (Level) | 2 | | −2 | | 2 | | 2 | |
| Decoded Data (Binary) | 1 | | 0 | | 1 | | 1 | |

The original binary data 1011 is recovered from the decoded level-based signal by assigning a value of 1 to the signal levels greater than zero, and a 0 to the signal levels less than zero. The original data transmitted by the second router can be recovered by decoding the combined signal as follows:

| Combined Data (Level) | 0 | −2 | −2 | 0 | 2 | 0 | 2 | 0 |
|---|---|---|---|---|---|---|---|---|
| Code (Level) | 1 | 1 | 1 | 1 | 1 | 1 | 1 | 1 |
| Dot Product | (0,−2)(1,1) | | (−2,0)(1,1) | | (2,0)(1,1) | | (2,0)(1,1) | |
| Encoded Data (Binary) | (0−2) | | (−2+0) | | (2+0) | | (2+0) | |
| Decoded Data (Level) | −2 | | −2 | | 2 | | 2 | |
| Decoded Data (Binary) | 0 | | 0 | | 1 | | 1 | |

If no data was sent using the given Walsh code, the decoded level-based signal will be all zeros. This may be used to detect when a particular network device fails to send a network counter or diagnostic information.

In some implementations, network counters may be encoded and decoded using an orthogonal code that multiplies each counter by a factor associated with the source of the counter. For example, network counters having a value between zero and 100 may be encoded by multiplying a counter generated by a first entity by one, multiplying a counter generated by a second entity by 100, and multiplying a counter generated by a third entity by 10,000. The encoded values can be transmitted to a router and combined by adding the values into a single combined value. The original values can be decoded by dividing the combined value by factors of 100, and determining the remainder. In the above example dividing the combined value by 100 and taking the remainder yields the counter generated by the first entity. Dividing the result by 100 again and taking the remainder yields the counter generated by the second entity. Dividing the result by 100 yet again and taking the remainder yields the counter generated by the third entity. In some implementations, encoding of network counters may be accomplished by multiplying the network counters by a factor of two. Multiplication by factors of two may be optimized by performing binary shifts on the network counters. Decoding may be accomplished by applying a binary mask to the encoded single value to isolate the particular bits containing the desired network counter.

In yet another implementation, prime numbers may be used to encode and decode diagnostic information on the computer network. In one example, each router is assigned a prime number as an ID, and each network counter may have a value of one or zero. A zero value is encoded as a zero, and a one value is encoded as the prime number associated with the source of the value. In one example, the following prime numbers are assigned to the following network entities:

| Network Entity | Prime Code |
|---|---|
| First Router | 2 |
| Second Router | 3 |
| Third Router | 5 |
| Fourth Router | 7 |
| Fifth Router | 11 |

Binary network counters may be encoded by multiplying the value of the binary counter by the prime number assigned to each network entity. The values are combined by multiplying the encoded values.

| Network Entity | Prime Code | Counter Value | Encoded Value |
|---|---|---|---|
| First Router | 2 | 0 | 0 |
| Second Router | 3 | 1 | 3 |
| Third Router | 5 | 1 | 5 |
| Fourth Router | 7 | 0 | 0 |
| Fifth Router | 11 | 1 | 11 |
| Combined Value | | | 165 |

Decoding the encoded value is accomplished by factoring the combined value into its prime numbers. If the combined value divided evenly by a particular prime that is associated with a particular network entity, the value of the network counter transmitted by the particular network entity is a one. If the combined value does not divide evenly by the particular prime, the value of the network counter transmitted by the particular network entity is a zero. The decoding process is illustrated in the following example:

| Network Entity | Prime Code | Combined Value | Division Result | Division Remainder | Counter Value |
|---|---|---|---|---|---|
| First Router | 2 | 165 | 82 | 1 | 0 |
| Second Router | 3 | 165 | 55 | 0 | 1 |
| Third Router | 5 | 165 | 33 | 0 | 1 |
| Fourth Router | 7 | 165 | 23 | 4 | 0 |
| Fifth Router | 11 | 165 | 15 | 0 | 1 |

Encoding diagnostic packets using primes as shown above may be used to detect a loss of connectivity. In one example, each router of the five above routers periodically sends a diagnostic keep-alive packet. The diagnostic keep-alive packets are accumulated at a network console and compared to 28, a value that indicates that the five routers have submitted diagnostic packets for the given time period. If the value of the combined diagnostic packet is less than 28, the network console determines that there is a problem with at least one of the five network routers. The problem routers may be identified by determining which network counters were not present in the combined value.

A client or other network entity may acquire an orthogonal code for encoding the diagnostic information by generating the code from various identifiers associated with the network entity. In some examples, a network entity retrieves a network address associated with the network entity, and generates an orthogonal code based at least in part on the network address. The network address may be an IP address, a media access control ("MAC") address, an IPX address, a processor ID, a hostname, or other unique identifier assigned to the network entity. In one implementation, the identifier associated with the network entity is converted to an index value, and the index value is used to extract a corresponding orthogonal code from a table of available orthogonal codes.

Figure 3:
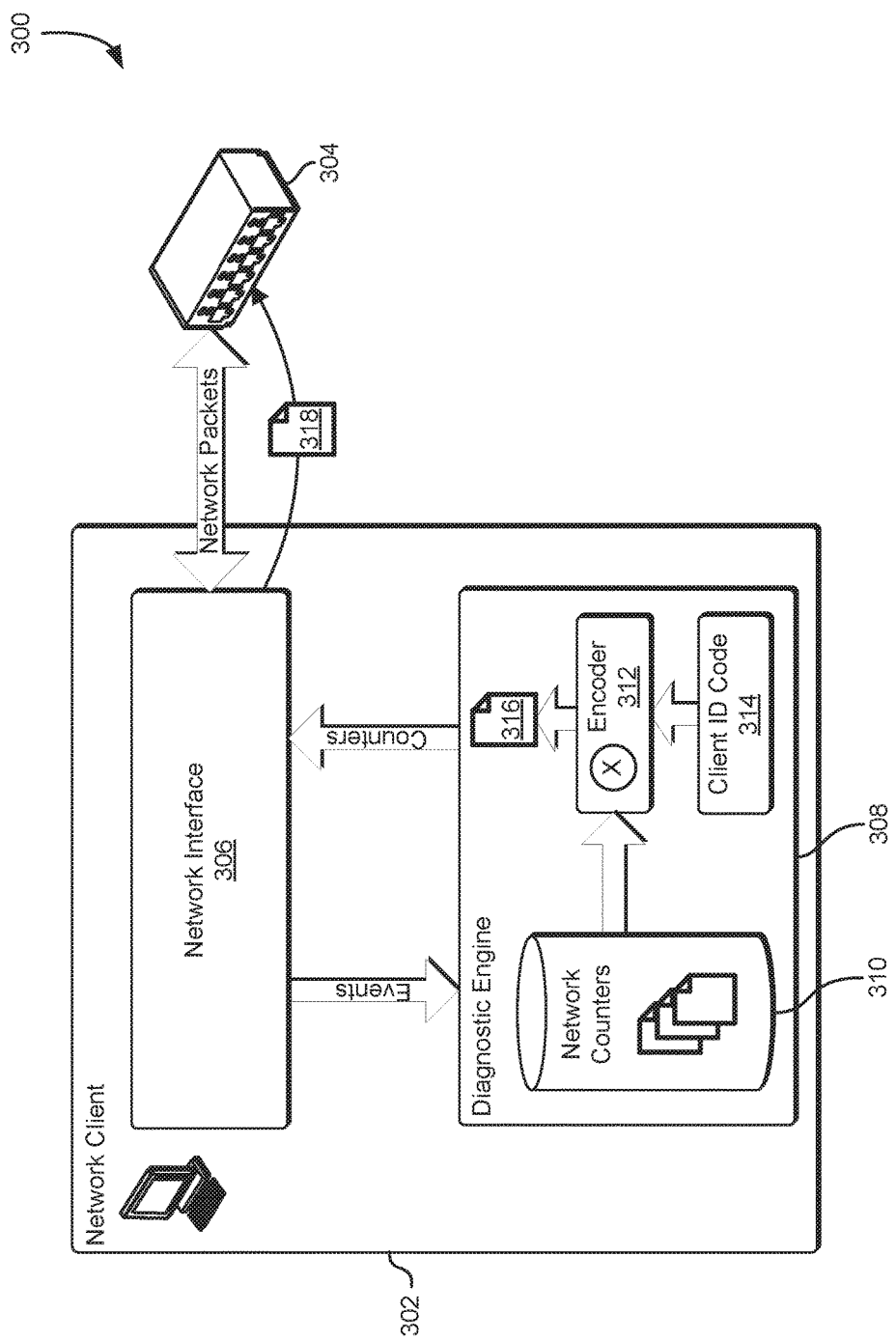
FIG. 3 shows an illustrative example of a network client that encodes diagnostic information and sends the encoded diagnostic information to a network router.

FIG. 3 shows an illustrative example of a network client that encodes diagnostic information and sends the diagnostic information to a network router. A block diagram 300 shows a network client 302 that is connected to a computer network via a router 304. The network client 302 can be a personal computer, a mobile computer, a handheld device, or other network appliance. The network client 302 includes a network interface 306 coupled to a diagnostic engine 308. The diagnostic engine 308 receives information describing network events from the network interface 306. The diagnostic engine uses the network events to update a set of network counters stored in a diagnostic database 310. The diagnostic database 310 may include network counters that are updated repeatedly by the network interface 306.

The network client 302 may transmit diagnostic packets in response to requests received by the computer network, or periodically. As a result of receiving a request to transmit a diagnostic packet, the diagnostic engine 308 retrieves a network counter from the diagnostic database 310. An encoder 312 encodes the network counter using a client ID code 314. The client ID code 314 is assigned to the network client 302 by an administrator via a network management console. In various implementations, the encoder 312 encodes the network counter using Walsh codes, prime numbers, or bit masks, to produce an encoded network counter 316. The encoded network counter 316 is provided to the network interface 306 and is transmitted to the router 304 as a diagnostic packet 318.

In some implementations, the diagnostic database 310 maintains a plurality of network counters. The plurality of network counters are concatenated and encoded by the encoder 312 to produce an encoded plurality of network counters. The encoded plurality of network counters is sent as the diagnostic network packet 318.

Network counters maintained by the network client 302 may be updated periodically in the diagnostic database 310. When the diagnostic engine 308 retrieves the network counter, and sends a corresponding encoded network counter to the network interface 306, the diagnostic engine 308 automatically resets the network counter in the diagnostic database 310. For example, a network counter in the diagnostic database 310 may represent a number of received packets. As packets are received at the network interface 306, the network interface 306 causes the network counter in the diagnostic database 310 to be incremented. When the network client 302 receives a request to transmit the diagnostic packet, the diagnostic engine 308 retrieves the network counter from the diagnostic database 310, encodes the network counter, and causes a diagnostic packet to be transmitted to the router 304. As a result of retrieving and encoding the network counter, the diagnostic engine 308 resets the network counter in the diagnostic database 310.

Figure 4:
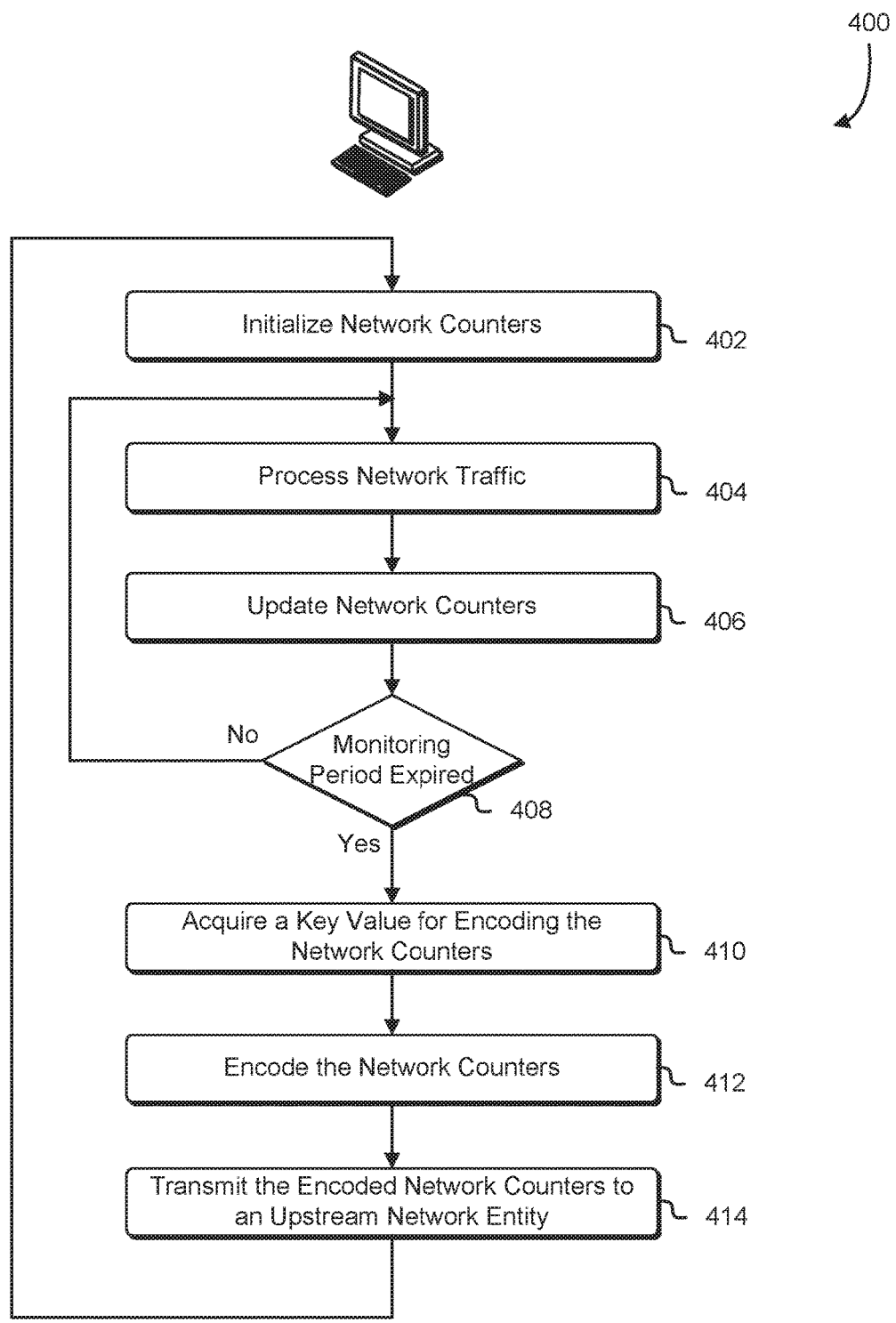
FIG. 4 shows an illustrative example of a process that, as a result of being performed by a network client, encodes a network counter and provides the encoded counter to a network router.

FIG. 4 shows an illustrative example of a process that, as a result of being performed by a network client, encodes a network counter and provides the encoded counter to a network router. A flowchart 400 shows a process that begins at block 402 with a network client initializing a set of network counters. The network counters may be initialized as a result of a power on event, an external reset command, or as a periodic operation as shown in FIG. 4.

A traffic processing loop begins at block 404. At block 404, the network client processes network traffic through a network interface. The processing of network traffic may include sending and receiving data on behalf of client applications hosted by the network client. Data transmission requests received from client applications may be processed by dividing the data associated with the request into packets, and transmitting the packets over the computer network. When data is received at the network interface, the network client identifies a destination application for the data, and provides the data to the identified application. As a result of processing the network traffic through the network interface, the network client updates, at block 406, network counters that are associated with the network interface. The network counters may include counters that track a number of data packets received by the network interface, a number of data packets transmitted by the network interface, a number of network collisions detected by the network interface, or number of corrupted packets received at the network interface. At decision block 408, the network client determines whether a monitoring period has expired. In some implementations, the monitoring period is a fixed amount of time. In another implementation, the monitoring period is determined by an amount of network traffic transmitted or received. In yet another implementation, the monitoring period is triggered by an external signal received at the network interface. If the network client determines that the monitoring period has not expired, execution returns to block 404 and additional network traffic is processed. If the network client determines that the monitoring period has expired, execution advances to block 410.

At block 410, the network client acquires a key value for encoding the network counters. In some examples, the key value is Walsh codes assigned to the network client by a central authority such as a network administrator or a network management console. In another example, the key value is a prime number that is unique for each network client in the computer network. Since at block 412, the network client encodes the network counters using an encoding algorithm in accordance with the key value. In some implementations, the network counters are concatenated into a single value and encoded. In another implementation, each network counter of the network counters is encoded separately. In yet another implementation, a unique key value is determined for each network counter, and each network counter is encoded separately. The network client transmits, at block 414, the encoded network counters to an upstream network entity such as a network router or network management console. In some examples, the encoded network counters are transmitted as a single diagnostic packet. In another example, each network counter is encoded with a different key value, and each encoded network counter is transmitted as a separate diagnostic packet.

After transmitting the encoded network counters to the upstream network entity, execution returns to block 402 and the network counters are reinitialized. In some implementations, execution returns to block 404, and the network counters are not reinitialized after each loop. In yet another implementation, the network client receives a confirmation that the information contained in the diagnostic packet has been received and processed by a central authority and, as a result of receiving the confirmation, the network counters are reinitialized.

Figure 5:
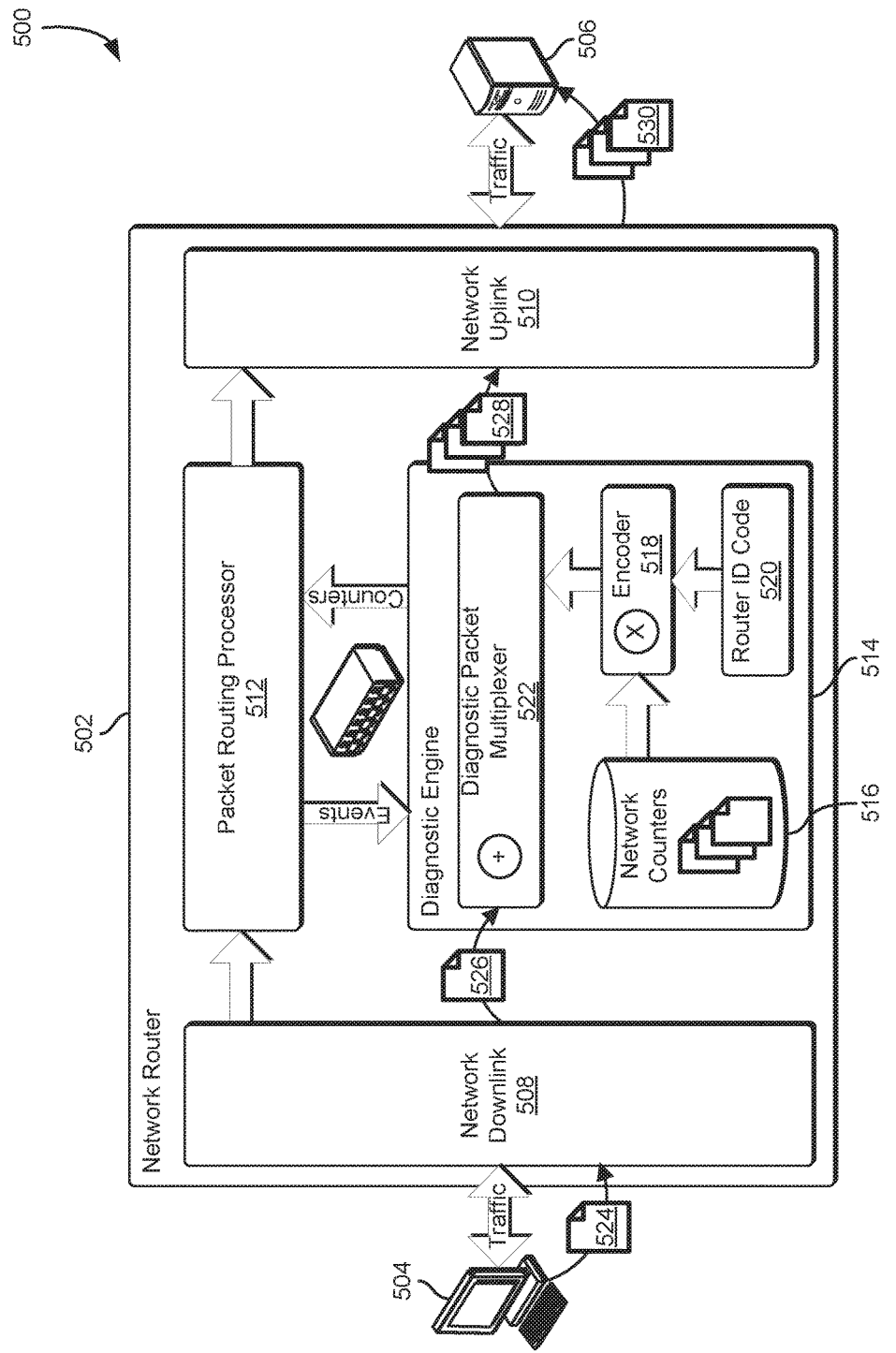
FIG. 5 shows an illustrative example of a network router that receives encoded diagnostic information from one or more clients, combines the encoded diagnostic information with additional diagnostic information generated by the network router, and provides the combined network information to an upstream network entity.

FIG. 5 shows an illustrative example of a network router that receives encoded diagnostic information from one or more clients, combines the encoded diagnostic information with additional diagnostic information generated by the network router, and provides the combined network information to an upstream server. A block diagram 500 shows a network router 502 that relays network packets between a network client 504 and a server 506. In some examples, the network router 502 is a dedicated network device located in a data center. In another example, the network router 502 is a virtual routing device in a virtual computing environment. In yet another example, the network router 502 is a combined Wi-Fi hotspot and network routing device in a home environment.

The network router 502 includes a network downlink 508 and a network uplink 510. The network downlink is a physical interface that allows communication between the network router 502 and the network client 504. In various implementations, the network downlink 508 may include a number of physical interfaces that allow communication between the network router 502 and a plurality of network clients. The physical interface may implement a mixture of wired connectivity and wireless connectivity options using 10BaseT Ethernet, 100BaseT Ethernet, Gigabit Ethernet, Wi-Fi, Bluetooth, fiber-optic, Token Ring, or fiber distributed data interface ("FDDI") technologies. The network uplink 510 provides connectivity between the network router 502 and the server 506. In some implementations the server 506 is an upstream router device. The interface between the network uplink 510 and the server 506 may be a wired or wireless interface.

A packet routing processor 512 performs network-routing functions and directs packets between various ports of the network downlink 508 and the network uplink 510. The packet routing processor 512 maintains routing information that allows the network router 502 to identify upstream routers capable of delivering outbound packets. When a network packet is sent from a first client connected to the network downlink 508 to a second client connected to the network downlink 508, the packet routing processor 512 determines that both network clients are connected to the network downlink 508 and routes the network packet from the first client to the second client. If a network packet is sent from the network client 504 to a remote server, the packet routing processor 512 determines that the destination for the network packet is not connected to the network downlink 508, and forwards the network packet via the network uplink 510 to an upstream router device. The upstream router device is identified based at least in part on the routing information maintained by the packet routing processor 512.

As the network router 502 performs network-routing functions, the packet routing processor 512 sends events to a diagnostic engine 514. In various examples, events are provided to the diagnostic engine 514 that indicate the transmission or reception of network packets, the reception of corrupt network packets, network collisions, and other diagnostic information. The diagnostic engine 514 uses the events to update a set of network counters that are maintained in a diagnostic database 516. The diagnostic engine 514 includes an encoder 518 and a router ID code 520. The encoder 518 implements an orthogonal encoding algorithm, and uses the router ID code 520 to encode network counters into encoded diagnostic packets. In response to a triggering event, the diagnostic engine 514 retrieves one or more network counters from the diagnostic database 516, encodes the one or more network counters using the encoder 518 and the router ID code 520.

The diagnostic engine 514 includes a diagnostic packet multiplexer 522. The diagnostic packet multiplexer 522 combines incoming diagnostic packets with encoded network counters produced by the encoder 518 to produce a combined diagnostic packet. The combined diagnostic packet includes the diagnostic information from the incoming diagnostic packet and the network counters in the diagnostic database 516. The diagnostic packet multiplexer 522 combines the incoming diagnostic packet with the encoded network counters using an algorithm in accordance with the encoding scheme of the diagnostic information. In some examples, the diagnostic packet multiplexer 522 converts the incoming diagnostic packet and the encoded network counters into compatible signals, and adds the signals together to form a combined signal. A digital representation of the combined signal is used as the combined diagnostic packet. In another example, the incoming diagnostic packet and the encoded network counters are encoded using prime numbers, and the diagnostic packet multiplexer 522 combines the incoming diagnostic packet and the encoded network counters by multiplying the incoming diagnostic packet and the encoded network counters. In yet another example, the incoming diagnostic packet and the encoded network counters are combined by adding the contents of the diagnostic packet and the encoded network counters. In yet another example, the incoming diagnostic packet and the encoded network counters are combined by concatenating the incoming diagnostic packet and the encoded network.

In an operational example, the network client 504 generates a network counter. The network counter represents diagnostic information associated with the computer network such as a number of packets transmitted or a number of corrupted packets received. The network client 504 encodes the network counter to form a diagnostic packet 524 using a unique orthogonal Walsh code assigned to the network client 504. The network client 504 transmits the diagnostic packet 524 to the network router 502. The network router 502 receives the diagnostic packet 524 at the network downlink 508. The network downlink 508 extracts the encrypted network counter 526 from the diagnostic packet 524, and forwards the encrypted network counter 526 to the diagnostic packet multiplexer 522. As a result of receiving the encrypted network counter 526, the diagnostic engine 514 retrieves one or more network counters from the diagnostic database 516, and provides the one or more network counters to the encoder 518. The encoder 518 encodes the one or more network counters using the router ID code 520. The router ID code 520 is a Walsh code assigned to the network router 502 by an administrative entity. The Walsh code used by the network router 502 and the code used by the network client 504 are different Walsh codes within the same space of Walsh codes. The diagnostic packet multiplexer 522 combines the encoded network counter 526 and the encoded one or more network counters produced by the encoder 518 into a combined diagnostic value 528. The combined diagnostic value 528 is produced by converting the encoded network counter 526 and the encoded one or more network counters produced by the encoder 518 into level-coded signals, adding the signals to each other, and producing a digital representation of the resulting signal. The diagnostic engine 514 sends the combined diagnostic value 528 to the network uplink 510. The network uplink 510 formats the combined diagnostic value 528 into a combined diagnostic packet, and transmits the combined diagnostic packet 530 to the server 506 or other upstream router.

Figure 6:
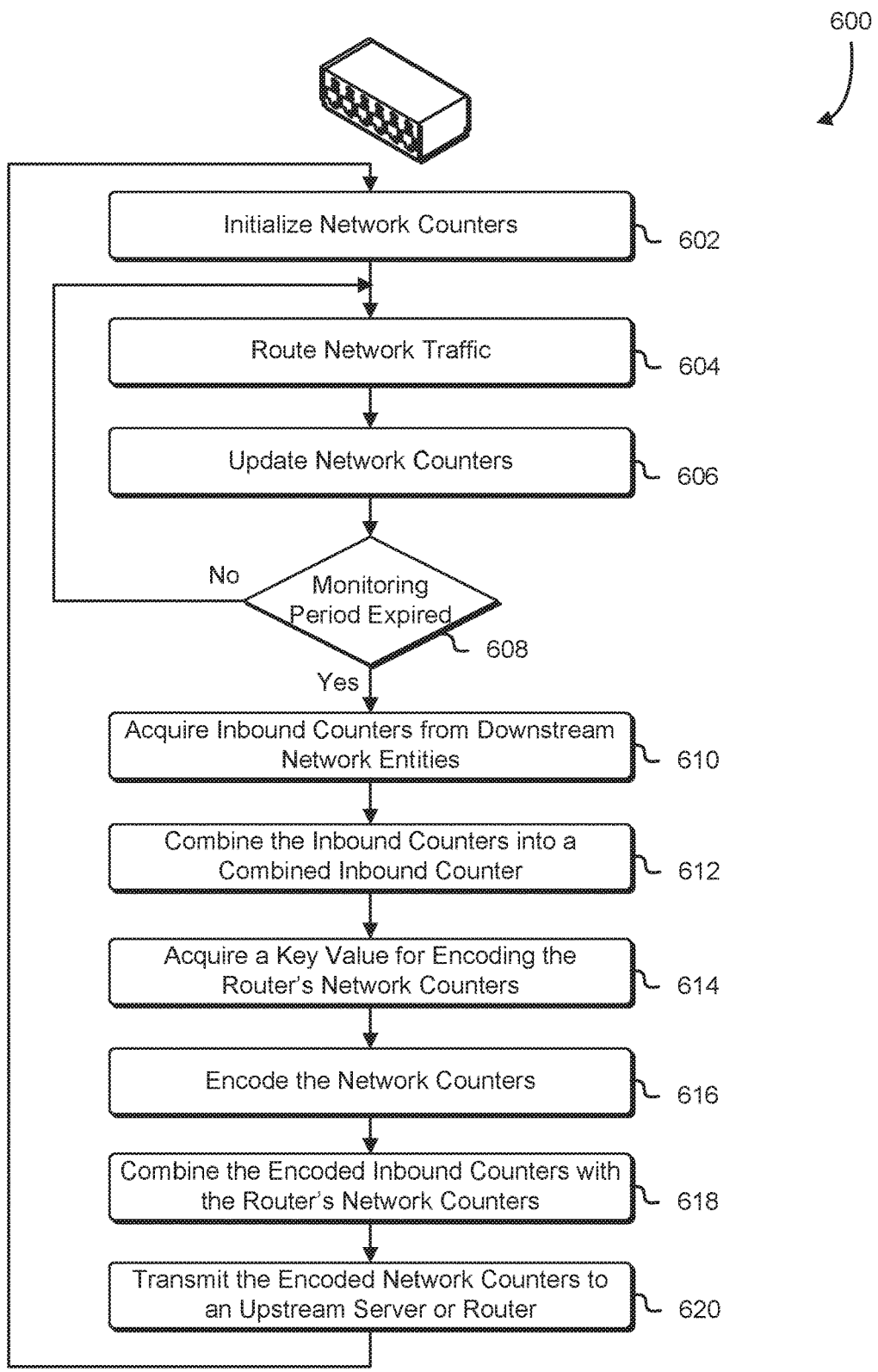
FIG. 6 shows an illustrative example of a process that, as a result of being performed by a network router, receives encoded diagnostic information from a network client, combines the encoded diagnostic information with additional diagnostic information generated by the network router, and provides the combined network information to an upstream network entity.

FIG. 6 shows an illustrative example of a process that, as a result of being performed by a network router, receives encoded diagnostic information from a network client, combines the encoded diagnostic information with additional diagnostic information generated by the network router, and provides the combined network information to an upstream network entity. A flowchart 600 illustrates a process that begins at block 602 with a network router initializing a set of network counters maintained in a diagnostic database. The network counters may include information that describes a number of packets sent or received via a particular network path, a number of packets received from a particular destination, or a number of errors detected.

At block 604, the router begins a processing loop that performs network routing functions and updates a corresponding set of network counters. At block 604, the network router receives a network packet from an uplink or downlink connection, and using information maintained by the network router, sends the network packet to an identified destination. At block 606, the network router updates one or more network counters based at least in part on the operations performed in block 604. For example, if the one or more network counters includes a counter that describes the number of packets routed, the counter that describes the number of packets routed is incremented. If the one or more network counters includes a counter that describes the number of packets received from the destination of the routed packet, the counter that describes the number of packets received from the destination is incremented. At decision block 608, the network router determines whether a monitoring period has expired. The monitoring period may be a fixed amount of time configured by network administrator. In some examples, the monitoring period is defined by a threshold number of routing operations performed at block 604. In yet another example, the monitoring period is expired when a particular network counter exceeds a threshold value. If the monitoring period is not expired, execution returns to block 604 and the network router continues performing routing operations and updating network counters. If the monitoring period has expired, execution advances to block 610. In yet another implementation, monitoring period expires as a result of receiving an inbound diagnostic packet.

At block 610, the network router acquires encoded inbound network counters from downstream network entities such as network clients, or downstream network routers. In some examples, the encoded inbound network counters include a plurality of separate encoded network counters received via separate diagnostic packets, and each network counter is encoded with a different orthogonal code. In another example, the encoded inbound network counters comprises a combined encoded network counter received from a downstream network router. At block 612, the network router combines the encoded inbound network counters into an intermediate combined inbound counter in accordance with the type of orthogonal code used to encode the inbound network counters, as described elsewhere in the present document.

At block 614, the network router acquires a key value for encoding the network counters maintained in the diagnostic database. In various implementations, the key value is a Walsh code, a prime number, or a multiplier that can be used to encode the network counters. The key value is selected to generate an orthogonal encoding between the combined inbound counter and the network counters maintained by the network router. The network router extracts the network counters from the diagnostic database and encodes 616 the network counters with the key value. The encoded network counters are combined 618 with the intermediate combined inbound counter to produce a combined network counter. Combining the encoded network counters with the intermediate combined inbound counter is accomplished in accordance with the type of orthogonal code used for the key value.

The network router formats the combined network counter into a diagnostic packet, and transmits 620 the diagnostic packet to an upstream router, network server, or network management console. After transmitting the diagnostic packet, execution returns to block 602 and the network router reinitializes the network counters.

Figure 7:
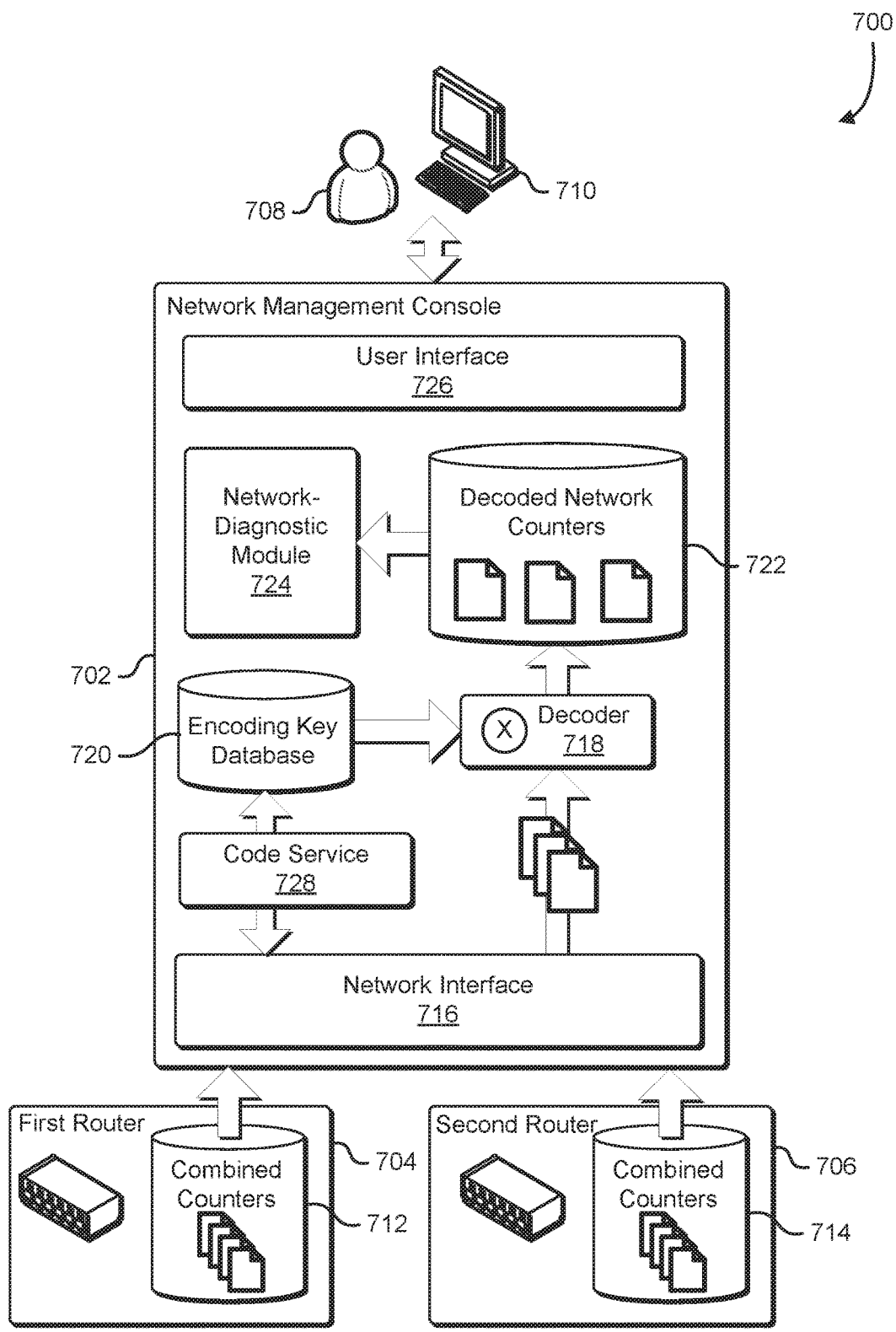
FIG. 7 shows an illustrative example of a network management console that allows an administrator to monitor a computer network by acquiring, decoding, and analyzing a set of network counters which are extracted from encoded diagnostic information maintained by routers on a computer network.

FIG. 7 shows an illustrative example of a network management console that allows an administrator to monitor a computer network by acquiring, decoding, and analyzing a set of network counters extracted from encoded diagnostic information maintained by routers on a computer network. A block diagram 700 shows a network management console 702 that collects diagnostic information from a first router 704 and a second router 706. The network management console 702 is accessed by an administrator 708 via a user display 710. The user display 710 may be a personal computer, a web browser, a tablet computer or other device that includes a display screen and an input device such as a keyboard, touchpad, or mouse. The network management console 702 may be implemented on the user display platform as a local application, or as a service running on a remote server.

Diagnostic information is maintained on the routers in an encoded form. The first router 704 includes a first diagnostic database 712. The first diagnostic database 712 retains a first set of encoded counters. The first set of encoded counters is stored as a single encoded value. Multiple network counters may be extracted from the single encoded value using multiple different orthogonal codes that correspond to codes used to encode each of the multiple network counters. In some implementations, the orthogonal codes are Walsh codes, but other orthogonal codes may be used as described elsewhere in the present document. The second router 706 includes a second diagnostic database 714 which retains a second set of encoded counters as a single encoded value. The second set of encoded counters may be a superset or subset of the encoded counters retained in the first diagnostic database 712.

The network management console 702 includes a network interface 716. The network interface 716 connects the network management console 702 to the first router 704 and the second router 706 via the computer network. The network management console 702 retrieves the sets of encoded network counters from the first router 704 and the second router 706 via the network interface 716, and provides the sets of encoded network counters to a decoder 718. For each set of encoded counters, the decoder retrieves a number of keys from an encoding key database 720. The decoder 718 uses the keys to extract and decode the network counters contained in each set of encoded network counters. The decoder 718 stores the decoded network counters and a decoded network counter database 722. A network diagnostic module 724 retrieves the network counters from the decoded network counter database 722, and analyzes the network counters to identify network anomalies, metrics, or faults that may be of interest to the administrator 708. A user interface 726 allows the administrator 708 to access the information generated by the network diagnostic module 724 by the user display 710.

In some examples, the network management console 702 includes a code service 728. The code service 728 receives requests from network entities located on the computer network via the network interface 716. In response to a request, the code service 728 generates an orthogonal code that is unique in the set of currently issued codes for the requester, and sends the orthogonal code over the computer network to the requester. Information identifying the requester, and the issued code, are saved in the encoding key database 720.

Figure 8:
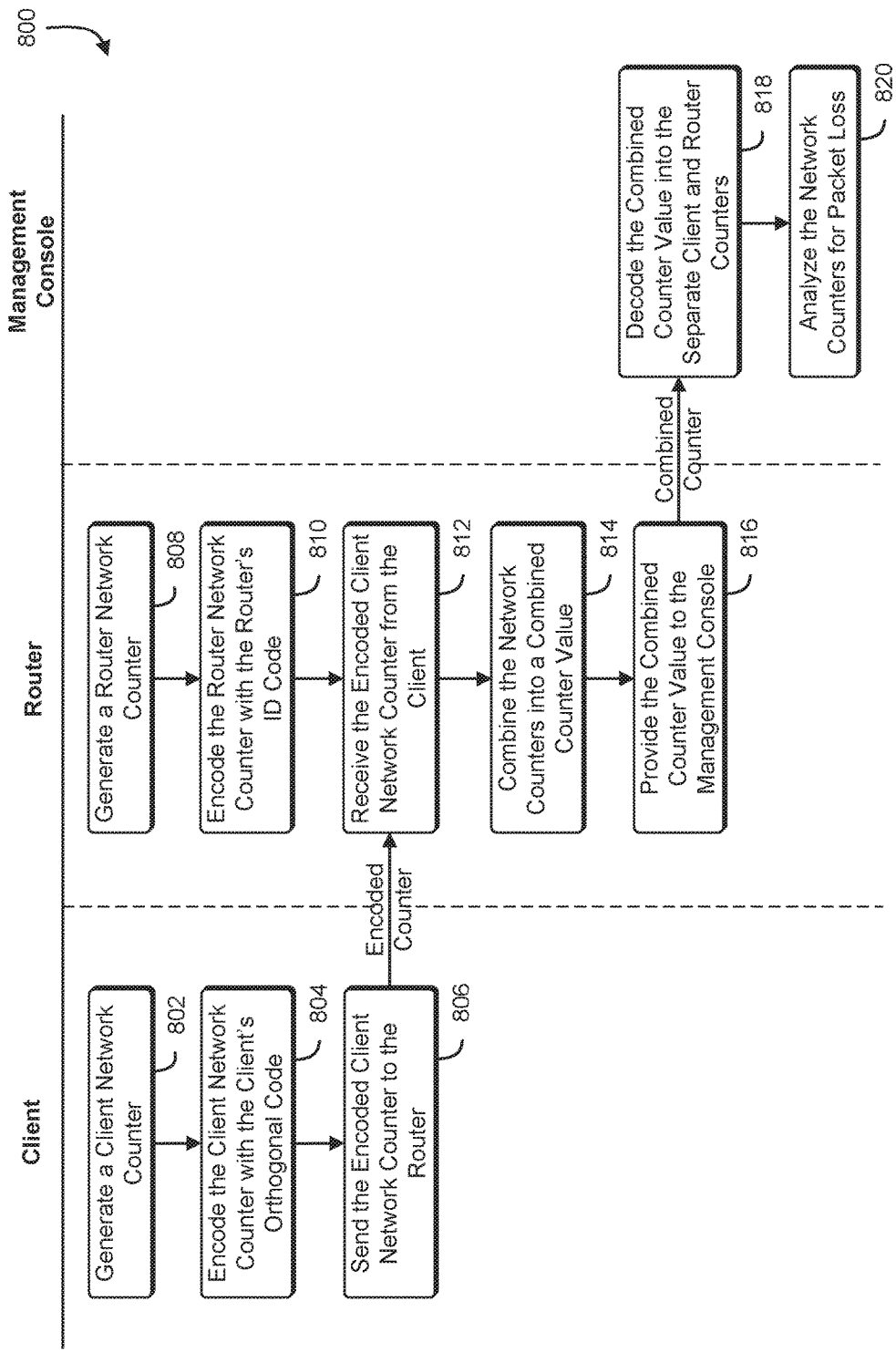
FIG. 8 shows an illustrative example of a process that, when performed by a client, a router, and a management console, sends network counters generated by the client and the router to a management console, and analyzes the network counters to detect network faults.

FIG. 8 shows an illustrative example of a process that, when performed by a client, a router, and a management console, sends network counters generated by the client and the router to a management console, and analyzes the network counters to detect network faults. A swim diagram 800 shows a process that begins at block 802 with a client on a computer network generating a network counter. The network counter can represent a number of network faults, a number of packets sent or received from a particular host, or number of network packets transmitted along a particular network path. The client encodes 804 the network counter using an orthogonal code assigned to the client, to produce an encoded network counter. The encoded network counter is transmitted 806 from the client to a router on the computer network in the form of a diagnostic packet.

At block 808, the router generates a network counter. The network counter may represent a number of packets sent or received by the router, or number of packets routed along a particular network path by the router. The router encodes 810 the network counter using an orthogonal code assigned to the router to produce an encoded network counter. The orthogonal code assigned to the router and the orthogonal code assigned to the client are different codes within a common set of orthogonal codes. In some implementations, the set of orthogonal codes is a set of Walsh codes.

At block 812, the router receives the encoded network counter from the client. At block 814, the router combines the encoded network counter received from the client with the encoded network counter generated by the router. The encoded network counters are combined using a method that is based at least in part on the type of orthogonal code used to encode the network counters. For additional information on how the encoded network counters may be combined see FIG. 2 and the associated description in the present document. At block 816, the router formats the combined network counters into a diagnostic packet and transmits the diagnostic packet over the computer network to a management console.

The management console receives the diagnostic packet, and decodes 818 the diagnostic packet into the network counters generated by the client and the router. The diagnostic packet is decoded using the orthogonal codes used by the client and the router. For example, the network counter generated by the client is extracted from the diagnostic packet using the orthogonal code assigned to the client. The network counter associated with the router is extracted from the diagnostic packet using the orthogonal code assigned to the router. Management console uses the network counters to analyze 820 network performance and identify packet loss, corruption, or other network problems. For example, to identify packet loss along a particular network path, the management console retrieves network counters from a number of devices on the particular network path. Each network counter represents a number of packets relayed by the device along the particular network path. If the management console sees a drop in the number of packets relayed at a particular device, the management console determines that packet loss is occurring between the two devices where the change occurs.

Figure 9:
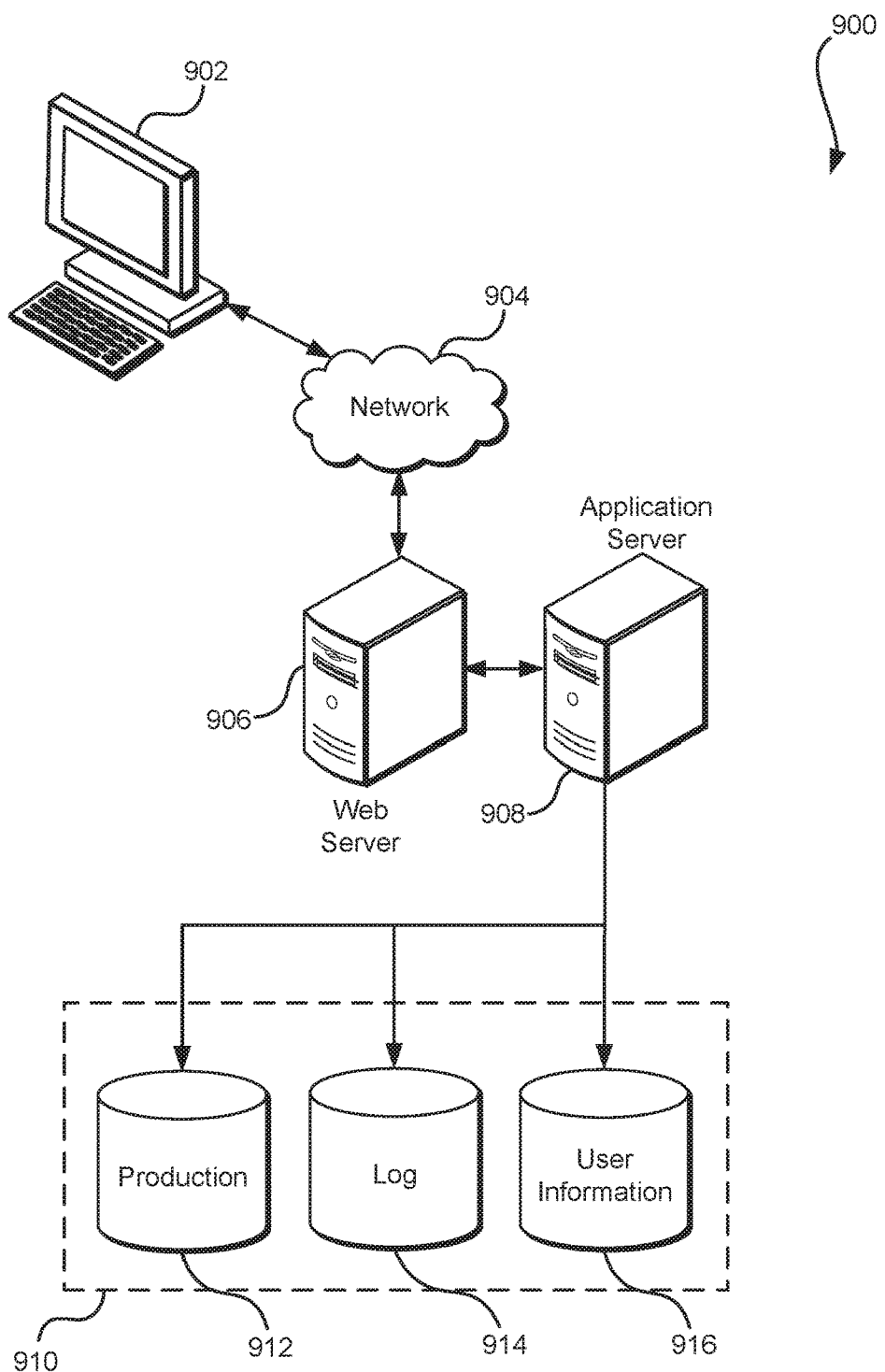
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes, and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 902. Information for a particular item of interest can be viewed in a dedicated page or window of the browser. It should be noted, however, that embodiments of the present disclosure are not necessarily limited to the context of webpages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

What is claimed is:

1. A computer-implemented method, comprising:
   under control of a computer system connected to a computer network, the computer system configured with executable instructions,
      generating a network counter based on communications between the computer system and other computer systems on the computer network;
      acquiring an orthogonal code value having no pairwise cross correlations with a set of orthogonal codes associated with the other computer systems connected to the computer network;
      encoding the network counter with the orthogonal code to produce an encoded network counter;
      receiving an additional encoded network counter via the computer network, the additional encoded network counter encoded with an additional orthogonal code from the set of orthogonal codes;
      combining the encoded network counter with the additional encoded network counter to form a combined diagnostic packet that preserves information from both the network counter and the additional encoded network counter; and
      transmitting the combined diagnostic packet over the computer network.

2. The computer-implemented method of claim 1, wherein:
   the orthogonal code and the set of orthogonal codes are Walsh codes or Hadamard codes;
   there are at least as many orthogonal codes in the set of orthogonal codes as there are network entities on the computer network; and
   the encoded network counter is combined with the additional encoded network counter by adding corresponding bitwise components of the encoded network counter and the additional encoded network counter.

3. The computer-implemented method of claim 1, further comprising:
   saving the combined diagnostic packet in a data store accessible to the computer system;
   receiving, from a management console, a request for diagnostic information; and
   in response to the request, providing the combined diagnostic packet to the management console.

4. The computer-implemented method of claim 1, wherein the orthogonal code is acquired by at least generating the orthogonal code based on a network address associated with the computer system.

5. A system, comprising a computing device connected to a computer network, the computing device configured to implement a diagnostic service, wherein the diagnostic service is configured to:
   acquire diagnostic information relating to operation of the computing device on the computer network;
   encode the diagnostic information with an orthogonal code selected from a set of orthogonal codes to produce encoded diagnostic information;
   acquire additional encoded diagnostic information relating to operation of a different computing device on the computer network, the additional encoded information encoded with a different orthogonal code selected from the set of orthogonal codes; and
   combine the encoded diagnostic information and the additional encoded diagnostic information to produce combined diagnostic information, the diagnostic information and additional diagnostic information being recoverable by decoding the combined diagnostic information with the orthogonal code and the different orthogonal code.

6. The system of claim 5, wherein the diagnostic service is further configured to:
   generate a diagnostic packet that includes the combined diagnostic information; and
   transmit the diagnostic packet to an additional computer system on the computer network.

7. The system of claim 6, wherein the diagnostic service is further configured to periodically regenerate and transmit the diagnostic packet based on updated diagnostic information.

8. The system of claim 6, wherein the diagnostic service is further configured to:
   determine that the diagnostic information satisfies a condition; and
   as a result of determining that the diagnostic information satisfies the condition:
      generate the diagnostic packet that includes the combined diagnostic information, and
      transmit the diagnostic packet to the additional computer system on the computer network.

9. The system of claim 5, wherein the diagnostic information is a network counter that represents a number of data packets transmitted along a particular network path of the computer network.

10. The system of claim 5, wherein the diagnostic service is further configured to:
    decode the additional encoded diagnostic information using an orthogonal code associated with a potential source of diagnostic information; and
    determine that the additional encoded diagnostic information does not include diagnostic information from the potential source of diagnostic information.

11. The system of claim 5, wherein:
    the orthogonal code is a prime number; and
    the encoded diagnostic information and the additional encoded diagnostic information are combined by multiplying the encoded diagnostic information and the additional encoded diagnostic information.

12. The system of claim 5, wherein:
    the diagnostic information is encoded by multiplying the diagnostic information by the orthogonal code; and
    the encoded diagnostic information and the additional encoded diagnostic information are combined by adding the encoded diagnostic information and the additional encoded diagnostic information.

13. The system of claim 5, wherein the set of orthogonal codes is a set of Walsh codes.

14. A non-transitory computer-readable storage medium having stored thereon executable instructions that, as a result of being executed by one or more processors of a computer system, cause the computer system to at least:
    receive an encoded diagnostic packet from a network entity via a computer network;
    decode the encoded diagnostic packet with a plurality of orthogonal codes to produce a plurality of network counters, the plurality of orthogonal codes associated with respective diagnostic-information sources on the computer network;

analyze the plurality of network counters to produce diagnostic information associated with the computer network; and present the diagnostic information on a user interface accessible to a network administrator.

15. The non-transitory computer-readable storage medium of claim 14, wherein:

the instructions that cause the computer system to decode the diagnostic packet further comprise instructions that, as a result of being executed by the one or more processors, cause the computer system to retrieve the orthogonal codes from an encoding-key database using information that identifies the diagnostic-information sources; and the orthogonal codes are based on a square matrix having rows that are mutually orthogonal.

16. The non-transitory computer-readable storage medium of claim 14, wherein:

the plurality of diagnostic-information sources are network entities located on a particular network path of the computer network; and the plurality of network counters represent numbers of packets transmitted over the particular network path.

17. The non-transitory computer-readable storage medium of claim 16, wherein the instructions further include instructions that cause the computer system to:

determine, based on the plurality of network counters, that network packets transmitted along the particular network path are being lost;

identify a particular network entity that is causing the network packets to be lost;

determine that data has not been received from a particular diagnostic-information source by attempting to decode the encoded diagnostic packet with a particular orthogonal code associated with the particular diagnostic-information source; and as a result of having determined that data has not been received from the particular diagnostic-information source, determine that a network entity associated with the particular diagnostic-information source has failed.

18. The non-transitory computer-readable storage medium of claim 14, wherein the instructions further comprise instructions that, as a result of being executed by the one or more processors, cause the computer system to:

attempt to decode the diagnostic packet using a particular orthogonal code associated with a particular source of diagnostic information; and as a result of having attempted to decode the diagnostic packet with the particular orthogonal code, determine that the diagnostic packet does not include diagnostic information from the particular source of diagnostic information.

19. The non-transitory computer-readable storage medium of claim 14, wherein the instructions further cause the computer system to transmit a reset signal to one of the plurality of diagnostic-information sources, the reset signal causing the one diagnostic-information source to reset a particular one of the plurality of network counters.

20. The non-transitory computer-readable storage medium of claim 14, wherein the instructions further cause the computer system to:

receive, from a network entity, a request for an orthogonal code;

store the orthogonal code in association with the network entity in an encoding-key database; and provide the orthogonal code to the network entity.

* * * * *